US007012417B2

(12) United States Patent
McClure

(10) Patent No.: US 7,012,417 B2
(45) Date of Patent: Mar. 14, 2006

(54) VOLTAGE REGULATOR WITH STRESS MODE

(75) Inventor: David C. McClure, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 10/690,332

(22) Filed: Oct. 21, 2003

(65) Prior Publication Data

US 2005/0083028 A1 Apr. 21, 2005

(51) Int. Cl.
*G05B 24/02* (2006.01)
*H02J 1/00* (2006.01)

(52) U.S. Cl. ........................ 323/318; 323/284; 323/285

(58) Field of Classification Search ................ 323/318, 323/284, 285
See application file for complete search history.

(56) References Cited

U.S. PATENT DOCUMENTS 4,323,960 A * 4/1982 Jones .......................... 363/48
5,708,577 A * 1/1998 Mckinley ..................... 363/89
6,137,696 A * 10/2000 Hall et al. ............... 363/21.05
6,366,068 B1 * 4/2002 Morishita .................... 323/282
6,445,170 B1 * 9/2002 Pangal et al. ............... 323/315
6,452,368 B1 * 9/2002 Basso et al. ................ 323/282
6,586,917 B1 * 7/2003 Smith ......................... 323/280
6,646,424 B1 * 11/2003 Zinn et al. .................. 323/268
6,819,596 B1 * 11/2004 Ikehashi et al. ....... 365/185.22

* cited by examiner

*Primary Examiner*—Bao Q. Vu
(74) *Attorney, Agent, or Firm*—Lisa K. Jorgenson; Renee Michelle Leveque

(57) ABSTRACT

An electronic device incorporates a primary function circuit and a voltage regulator that provides a regulated voltage signal to the primary function circuit. The voltage regulator is responsive to a stress-enable signal indicative of whether or not an external voltage supplied to the voltage detector is within a predetermined range. The output voltage signal is controlled to be at a first voltage level when the external voltage is within the predetermined voltage range and at a second voltage level when the external voltage is outside of the predetermined range. The second voltage level may be an elevated voltage level to facilitate stress testing or burin-in of the electronic device.

20 Claims, 3 Drawing Sheets

VOLTAGE REGULATOR WITH STRESS MODE

FIELD OF THE INVENTION

This invention relates generally to the field of voltage regulators. More particularly, this invention relates to a voltage regulator having both a normal mode and a stress mode to facilitate the testing of voltage regulated devices.

BACKGROUND

Many electronic devices, such as memory chips, are tested using a "burn-in" test. During the burn-in test, the device is operated at an elevated voltage level and temperature. This process will cause marginal devices to fail and results in improved life expectancy for the surviving devices. However, some devices incorporate an internal voltage regulator. If an elevated voltage is supplied to the device, the regulator may be tested but most of the device remains untested because the regulator limits the voltage applied.

SUMMARY

The present invention relates generally to a voltage regulator having a normal mode and a stress mode. Objects and features of the invention will become apparent to those of ordinary skill in the art upon consideration of the following detailed description of the invention.

In one embodiment of the invention a voltage regulator is provided that is operable in a normal mode or a stress mode. In the stress mode, the controlled voltage of the regulator may be elevated to facilitate "burn-in" testing of electronic devices. The stress mode may be invoked, for example, by elevating the voltage supplied to the device above a prescribed maximum operational voltage or by supplying a control signal to the device.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
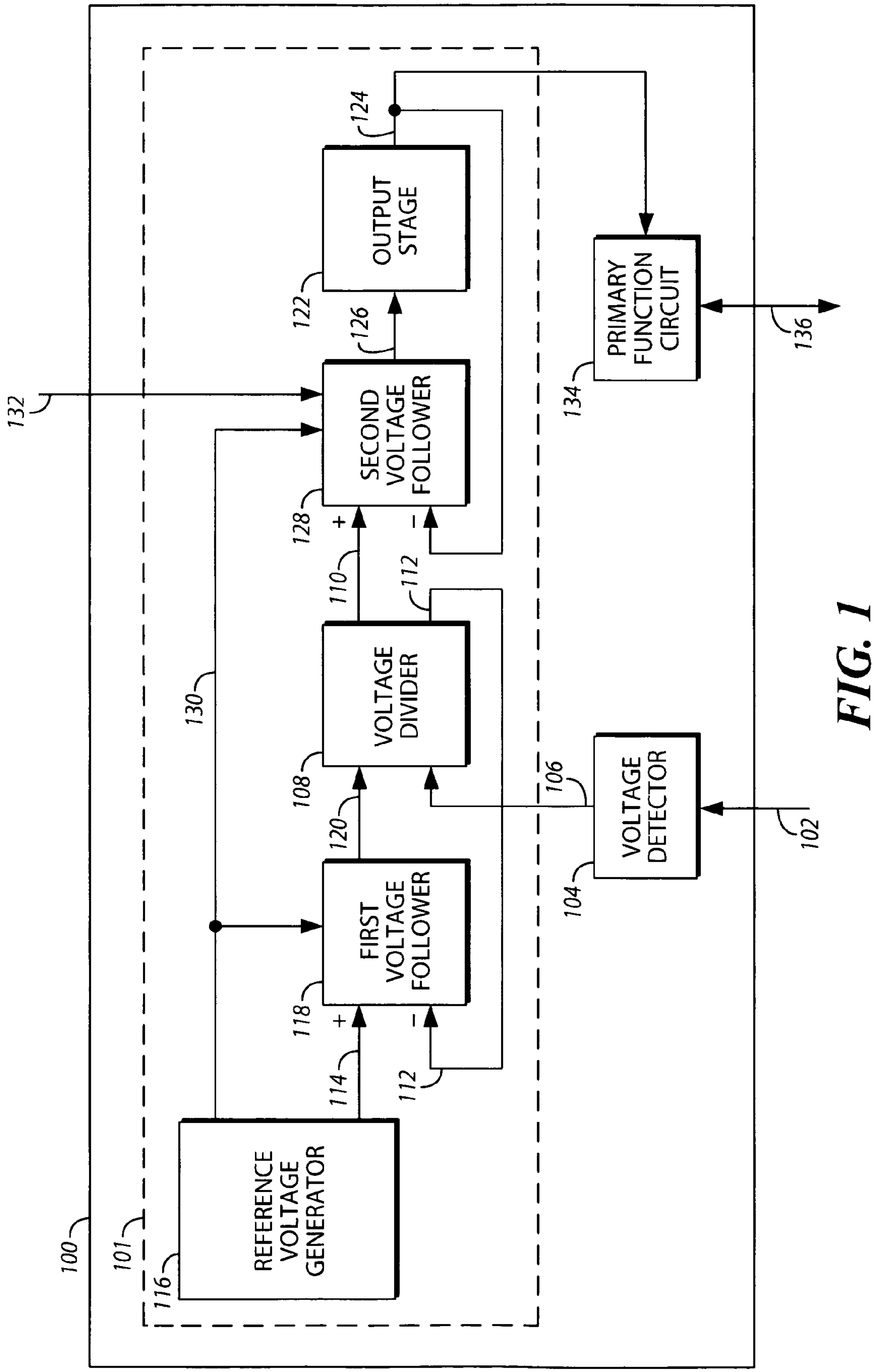
FIG. 1 is a diagrammatic representation of an electronic device incorporating voltage regulator in accordance with certain aspects of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

In one embodiment of the invention a voltage regulator is provided that is operable in a normal mode or a stress mode. In the stress mode, the controlled voltage of the regulator may be elevated to facilitate "burn-in" testing of electronic devices. The stress mode may be invoked, for example, by elevating the voltage supplied to the part above a prescribed maximum operational voltage. When the elevated voltage is detected the regulator switches from providing normal voltage level to providing an alternative voltage level. In burn-in testing the alternative voltage level is a higher level. For example, if the normal voltage provided by the regulator is 1.8V, the elevated voltage may be 3.0V. The higher voltage allows the device under test to be stressed during burn-in or other testing. The regulator may alternatively be switched to a stress mode in which the regulated voltage is lower than the normal voltage. This may be useful, for example, for testing the effects of signal degradation. In alternative embodiment, the stress mode is invoked by supplying an external stress-mode control signal to the regulator.

A diagrammatic representation of an electronic device 100 incorporating an exemplary of embodiment of a voltage regulator 101 of the present invention is shown in FIG. 1. The regulator is integrated in an electronic device and powers a primary function circuit 134 with interface 136. The primary function circuit performs the primary function of the electronic device, which may be memory storage. In operation, an external voltage signal 102 is applied to a voltage level detector 104. The voltage level detector 104 outputs a stress-mode signal 106 indicative of whether or not the external voltage signal is within a predetermined normal operating range. If the external voltage signal is outside of the predetermined normal operating range, the stress-mode signal causes the regulator to enter a test mode in which the primary function circuit 134 is stressed to reveal faults in the device. In an alternative embodiment, the stress-enable signal is generated external to the device and is supplied to the device by a connector or pin. This avoids the need for the voltage detector circuit 104, but introduces a need for an extra pin on the device and may make the testing of devices more complicated. In the exemplary embodiment shown in FIG. 1, the stress-enable signal 106 is coupled to a voltage divider 108 and is used to control the level of an output signal 110 from the voltage divider. The second output 112 of the voltage divider is held at a fixed level. The fixed level is determined by a reference voltage signal 114 from a reference voltage generator 116, which may, for example, be a bandgap voltage generator. The second output 112 of the voltage divider and the reference voltage signal 114 are coupled to the inputs of a first voltage follower 118 that completes a feedback loop and produces a control signal 120 that controls the voltage divider 108 to maintain the second output 112 at a fixed level relative to the reference voltage signal 114.

The first output signal 110 from the voltage divider is used as a reference voltage for an output stage 122 that provides the regulated voltage signal 124. The regulated voltage signal 124 is used to power the primary function circuit that is integrated with the regulator. The primary circuit may be an array of random access memory cells and associated circuitry, for example. The output stage 122 is controlled by a signal 126 from a second voltage follower circuit 128. The second voltage follower circuit 128 is responsive to the regulated voltage signal 124 and to the first output signal 110 generated by the voltage divider. The voltage follower completes a feedback loop and maintains the regulated voltage signal 124 at the desired level. A bias voltage signal 130 is supplied to the first and second voltage followers. Optionally, a disable signal 132 may be supplied as an input to the second voltage follower 128 to provide a means for disabling the regulator if required.

Figure 2:
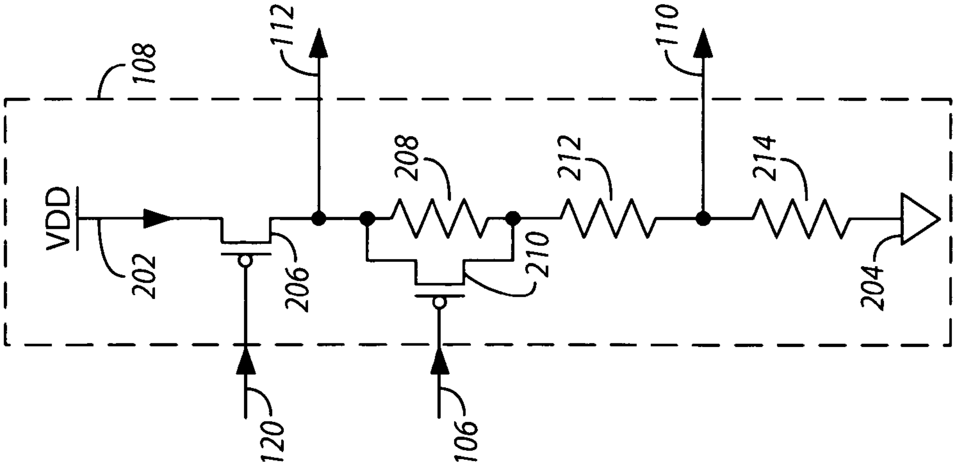
FIG. 2 is a diagrammatic representation of one embodiment of a voltage divider circuit in accordance with certain aspects of the present invention.

An exemplary voltage divider 108 is shown in FIG. 2. Referring to FIG. 2, a supply voltage 202 (labeled VDD) is coupled to ground 204 through a network of elements. Element 206 is a p-channel transistor controlled by the signal 120 from the first voltage follower. The signal 120 is adjusted by the first voltage follower to maintain the voltage level at a first point in the voltage divider at a fixed level. The signal 112 couples the voltage at the first point to an input of the first voltage follower. The next elements in the voltage divider are a resistor 208 in parallel with a p-channel transistor 210. The gate of the transistor 210 receives the stress-enable signal 106. The combined resistance of the transistor 210 and resistor 208 is therefore controlled by the stress-enable signal. The remaining elements of the divider are additional voltage divider resistors 212 and 214. The output 110 from the voltage divider is used as a reference voltage for the second voltage divider. The level of this reference voltage depends upon the combined resistance of the transistor 210 and resistor 208 is therefore controlled by the stress-enable signal.

Figure 3:
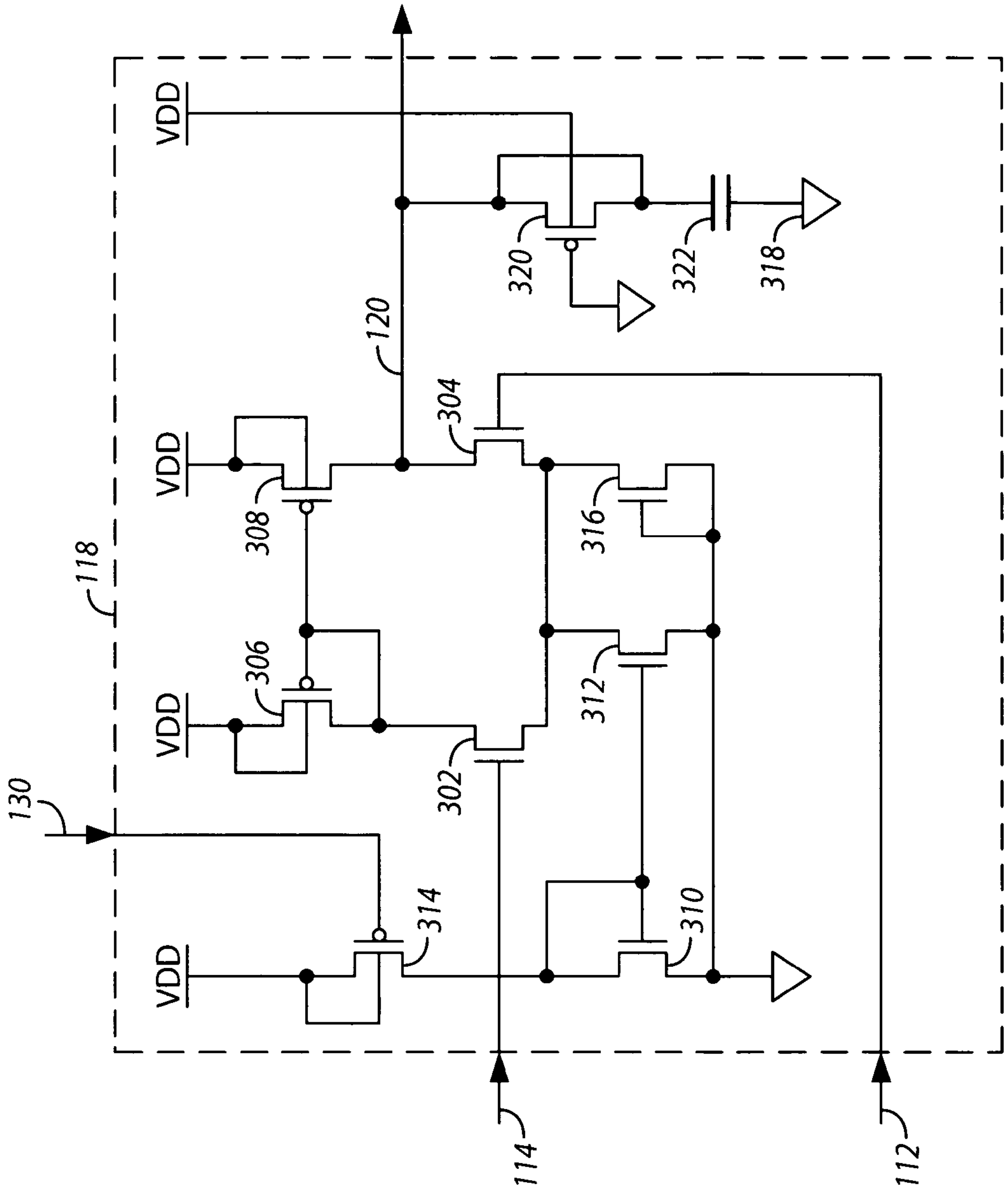
FIG. 3 is a diagrammatic representation of one embodiment of a first voltage follower circuit in accordance with certain aspects of the present invention.

An exemplary circuit diagram for the first voltage follower 118 is shown in FIG. 3. Referring to FIG. 3, the bandgap reference voltage 114 and the reference voltage 112 of the voltage divider are coupled to n-channel transistors 302 and 304, respectively, of a difference amplifier. P-channel transistors 306 and 308 provide an active load to the difference amplifier. The difference amplifier utilizes current mirror (current source) biasing provided by transistors 310 and 312. The biasing level is controlled by the biasing signal 130 that is coupled to the gate of a p-channel transistor 314. Optionally, an additional transistor 316 may be provided for balancing. The output 120 from the first voltage follower is coupled to ground 318 through transistor 320 and capacitor 322.

Figure 4:
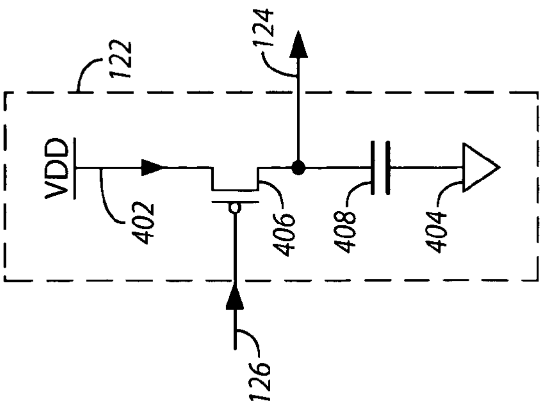
FIG. 4 is a diagrammatic representation of one embodiment of an output circuit in accordance with certain aspects of the present invention.

An exemplary output stage 122 is shown in FIG. 4. Referring to FIG. 4, a supply voltage 402 is coupled to ground 404 via a p-channel transistor 406 and a capacitor 408. The regulated output voltage signal 124 is passed to the second voltage follower that, in turn, produces control signal 126 that is coupled to the gate of transistor 406. This feedback loop maintains the regulated output voltage signal 124 at the desired level.

Figure 5:
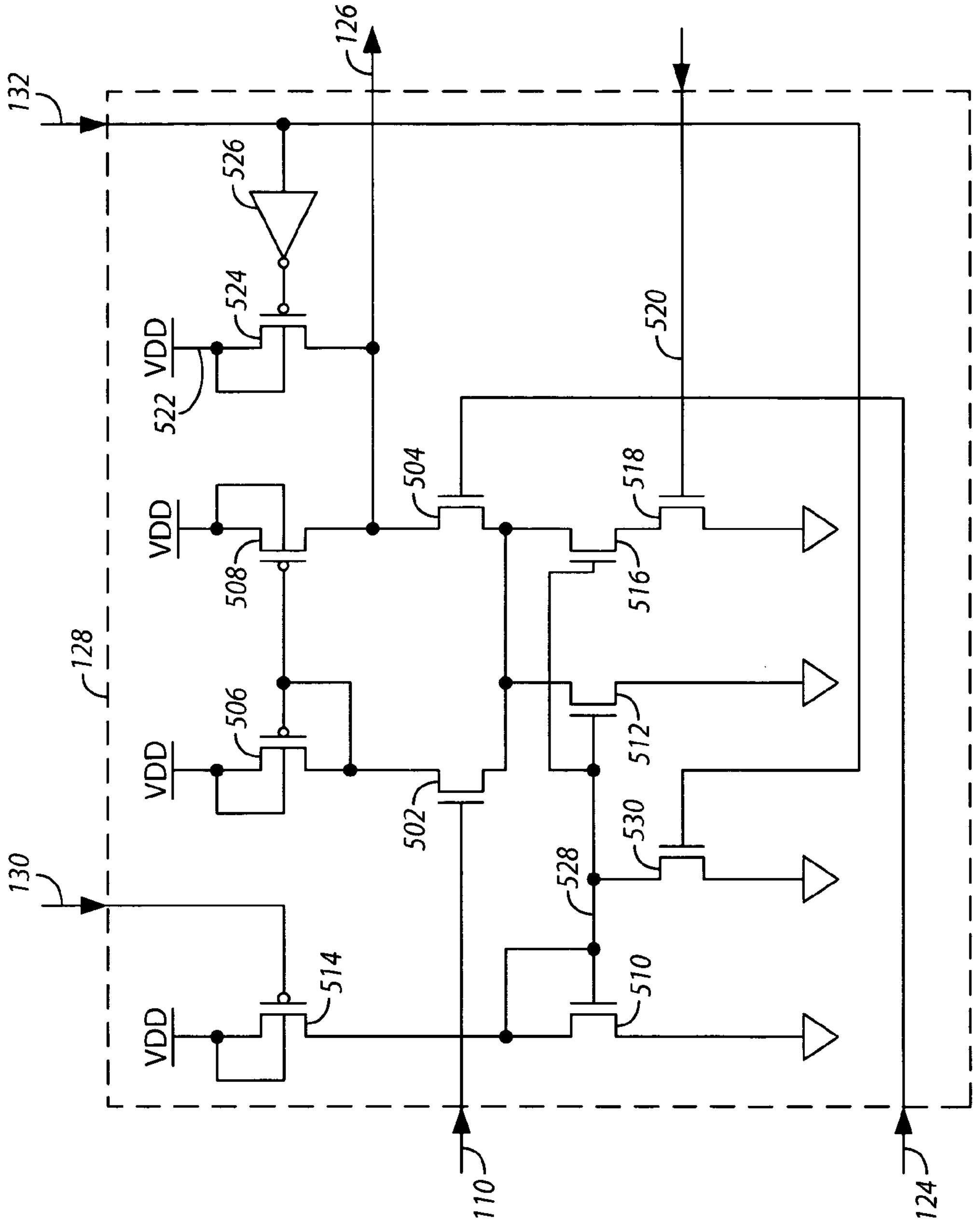
FIG. 5 is a diagrammatic representation of one embodiment of a second voltage follower circuit in accordance with certain aspects of the present invention.

An exemplary circuit diagram for the second voltage follower 128 is shown in FIG. 5. Referring to FIG. 5, the reference voltage 110 from the voltage divider and the regulated output voltage signal 124 are coupled to n-channel transistors 502 and 504, respectively, of a difference amplifier. P-channel transistors 506 and 508 provide an active load to the difference amplifier. The difference amplifier utilizes current mirror (current source) biasing provided by transistors 510 and 512. The biasing level is controlled by the biasing signal 130 that is coupled to the gate of a p-channel transistor 514. Optionally, transistors 516 and 518 may be included. The gate transistor 518 is controlled by signal 520 that is asserted when the regulator is active. The output 126 may be coupled to the voltage supply 522 through p-channel transistor 524 by passing the disable signal 132 through an inverter 526 to the gate of the transistor 524. The signal 126 is supplied to the gate of a p-channel transistor (406 in FIG. 4) and so asserting this signal disables the regulated output voltage signal (124 in FIG. 4). The disable signal also disables the difference amplifier by shorting the amplifier bias signal 528 to ground via n-channel transistor 530.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An electronic device comprising:

a primary-function circuit; and a voltage regulator operable to protect the primary-function circuit from an external voltage signal outside a predetermined range when the electronic device is in a normal mode and responsive to a stress-enable signal operable to supply an output voltage signal to the primary-function circuit, the output voltage signal being at one of a first voltage level in the normal mode and a second voltage level in a stress mode dependent upon the stress-enable signal, wherein the primary function circuit and the voltage regulator are integrated in the electronic device.

2. An electronic device in accordance with claim 1, further comprising a voltage detector responsive to the external voltage signal and operable to produce the stress-enable signal, the stress-enable signal being indicative of whether or not the external voltage signal is within the predetermined range.

3. An electronic device in accordance with claim 1, wherein the voltage regulator comprises a voltage divider having a variable resistance element.

4. An electronic device in accordance with claim 3, wherein the variable resistance element of the voltage divider comprises a resistor coupled in parallel with a transistor, and wherein the gate of the transistor is controlled by the stress-enable signal.

5. An electronic device in accordance with claim 3, wherein the voltage regulator further comprises:

a reference voltage generator;

a first voltage follower coupled to the reference voltage generator and to a first position in the voltage divider and operable to control the voltage divider in a feedback loop.

6. An electronic device in accordance with claim 5, wherein the voltage regulator further comprises a second voltage follower coupled to a second position in the voltage divider and to the output voltage signal and operable to control the level of the output voltage signal in the feedback loop.

7. An electronic device in accordance with claim 6, further comprising an output stage having an output transistor operable to produce the output voltage signal, wherein the output from the second voltage follower is coupled to the gate of the output transistor.

8. An electronic device in accordance with claim 7, wherein the output stage further comprises a capacitor, the output transistor and the capacitor being connected in series between a voltage supply and a ground.

9. An electronic device in accordance with claim 6, wherein at least one of the first and second voltage followers comprises a difference amplifier.

10. An electronic device in accordance with claim 9, wherein the difference amplifier includes a current mirror biasing circuit.

11. An electronic device in accordance with claim 9, wherein the difference amplifier includes current mirror loading.

12. An electronic device in accordance with claim 5, wherein the reference voltage generator comprises a bandgap voltage generator.

13. A method for testing an electronic device having an integrated voltage regulator operable to produce a regulated voltage signal, the method comprising:

receiving a stress-enable signal indicative of whether a stress-mode is to be invoked; and if the stress-mode is be invoked:

controlling the level of the regulated voltage signal to a predetermined test level and providing a primary-function circuit of the electronic device with the predetermined test level in the stress-mode of the electronic device;

otherwise controlling the level of the regulated voltage signal to a predetermined normal operating level in a normal mode of the electronic device in which the primary-function circuit of the electronic device is protected from an external voltage signal outside a predetermined range that is supplied to the electronic device.

14. A method in accordance with claim 13, wherein the electronic device includes a voltage detector, further comprising:

supplying an external voltage signal to the voltage detector;

detecting the level of the external voltage signal; and generating the stress-enable signal to invoke the stress-mode if the level of the external voltage signal is outside of the predetermined range.

15. A method in accordance with claim 14, wherein the predetermined test level of the regulated voltage signal is higher than the predetermined normal operating level, thereby enabling the device to be stressed during testing.

16. A method in accordance with claim 13, wherein the voltage regulator incorporates a voltage divider having a variable resistance element, the method further comprising:

supplying the stress-enable signal to the voltage divider; and adjusting the resistance of the variable resistance element dependent upon the stress enable signal.

17. A method in accordance with claim 16, wherein adjusting the variable resistance element in the voltage divider dependent comprises:

supplying the stress-enable signal to the gate of a transistor, the transistor being coupled in parallel with a resistor of the voltage divider.

18. A method in accordance with claim 15, wherein the voltage regulator incorporates a first voltage follower, the method further comprising:

supplying a first voltage signal from a first point in the voltage divider to a first input of the first voltage follower;

supplying a reference voltage to a second input of the first voltage follower; and supplying the output of the first voltage follower to the voltage divider to thereby control the voltage at the first point in the voltage divider in a feedback loop.

19. A method in accordance with claim 18, further comprising generating the reference voltage using a bandgap voltage generator.

20. A method in accordance with claim 16, wherein the voltage regulator incorporates a second voltage follower coupled to an output stage, the method further comprising:

supplying a second voltage signal from a second point in the voltage divider to a first input of the second voltage follower;

supplying the regulated voltage signal to a second input of the second voltage follower; and supplying the output of the second voltage follower to the output stage to control the regulated voltage signal in a feedback loop.

* * * * *